(12) United States Patent
Zhao et al.

(10) Patent No.: US 9,736,714 B2
(45) Date of Patent: Aug. 15, 2017

(54) METHOD, SYSTEM, AND DEVICE FOR POWER HEADROOM REPORTING AND SUB-FRAME SCHEDULING

(75) Inventors: Yali Zhao, Beijing (CN); Fangli Xu, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 218 days.

(21) Appl. No.: 14/002,990

(22) PCT Filed: Feb. 29, 2012

(86) PCT No.: PCT/CN2012/071803
§ 371 (c)(1),
(2), (4) Date: Sep. 3, 2013

(87) PCT Pub. No.: WO2012/116643
PCT Pub. Date: Sep. 7, 2012

(65) Prior Publication Data
US 2013/0336228 A1 Dec. 19, 2013

(30) Foreign Application Priority Data
Mar. 3, 2011 (CN) .......................... 2011 1 0051866

(51) Int. Cl.
*H04W 24/10* (2009.01)
*H04W 52/36* (2009.01)
(Continued)

(52) U.S. Cl.
CPC ......... *H04W 24/10* (2013.01); *H04W 52/365* (2013.01); *H04W 52/146* (2013.01); *H04W 72/1231* (2013.01)

(58) Field of Classification Search
CPC ............ H04W 24/10; H04W 72/1231; H04W 52/365; H04W 52/146
(Continued)

(56) References Cited

U.S. PATENT DOCUMENTS

2010/0158147 A1* 6/2010 Zhang et al. ................. 375/260
2010/0297993 A1* 11/2010 Heo ..................... H04W 52/365
455/423

(Continued)

FOREIGN PATENT DOCUMENTS

CN          101895923 A     11/2010
CN          101931992 A     12/2010
(Continued)

OTHER PUBLICATIONS

Ericsson, ST Ericsson, "Details on PHR Reporting", May 10-14, 2010, 3GPP TSG-RAN WG2 #70, Tdoc R2-102960, pages: all.*

(Continued)

*Primary Examiner* — Jeffrey M Rutkowski
*Assistant Examiner* — Shah Rahman
(74) *Attorney, Agent, or Firm* — Blakely, Sokoloff, Taylor & Zafman LLP (57) ABSTRACT

Embodiments relate to the field of wireless communications, and particularly, to methods and apparatuses for power headroom reporting. In one embodiment, a method of power headroom reporting includes: determining PH information of each of configured and active cells at a current instant if PH information is required to be reported, where the configured and active cells include a cell which is configured with a downlink subframe at the current instant; and reporting the determined PH information. Since a power headroom is reported by obtaining PH information of a configured and active cell which is currently a downlink subframe
(Continued)

according to a virtual transmission format, the PH information facilitates subsequent scheduling by an eNB.

15 Claims, 3 Drawing Sheets

(51) Int. Cl.
    *H04W 52/14*     (2009.01)
    *H04W 72/12*     (2009.01)

(58) Field of Classification Search
    USPC .......................... 370/328; 455/517, 522, 524
    See application file for complete search history.

(56) References Cited

U.S. PATENT DOCUMENTS

| | | | |
|---|---|---|---|
| 2011/0105173 A1* | 5/2011 | Haim ................. | H04W 52/244 455/522 |
| 2012/0008552 A1* | 1/2012 | Baldemair .......... | H04W 52/146 370/328 |
| 2012/0057547 A1* | 3/2012 | Lohr ..................... | H04L 5/0007 370/329 |
| 2012/0113848 A1* | 5/2012 | Kim ..................... | H04W 52/365 370/252 |
| 2012/0224552 A1* | 9/2012 | Feuersanger et al. ........ 370/329 |
| 2012/0294167 A1* | 11/2012 | Zhu et al. ..................... 370/252 |
| 2013/0010720 A1* | 1/2013 | Lohr et al. ..................... 370/329 |
| 2013/0279377 A1* | 10/2013 | Zhao ....................... | H04L 5/001 370/280 |
| 2014/0016555 A1* | 1/2014 | Zhao .................... | H04W 24/10 370/328 |

FOREIGN PATENT DOCUMENTS

| | | | |
|---|---|---|---|
| CN | 102123437 A | 7/2011 | |
| CN | WO 2011124259 A1 * | 10/2011 | ........... H04L 5/0007 |
| WO | WO 2010/065759 A2 | 6/2010 | |

OTHER PUBLICATIONS

PCT International Search Report for PCT Counterpart Application No. PCT/CN2012/071803, 5 pgs., (May 31, 2012).

PCT Written Opinion of the International Searching Authority for PCT Counterpart Application No. PCT/CN2012/071803, 20 pgs., (May 31, 2012).

3GPP, "3rd Generation Partnership Project; Technical Specification Group Radio Access Network; Evolved Universal Terrestrial Radio Access (E-UTRA); Physical Layer Procedures (Release 10)", 3GPP TS 36.213, V10.0.1, 98 pages, (Dec. 2010).

3GPP, "3rd Generation Partnership Project; Technical Specification Group Radio Access Network; Evolved Universal Terrestrial Radio Access (E-UTRA); Medium Access Control (MAC) Protocol Specification (Release 10)", 3GPP TS 36.321, V10.0.0, 53 pages, (Dec. 2010).

European Patent Office Communication enclosing Extended European Search Report for corresponding European Patent Application No. 12752136.7, 13 pages, (Dec. 8, 2014).

Ericsson, "Summary of E-Mail Discussion [71#57] LTE CA: PHR Reporting", 3GPP TSG-RAN WG2 #71bis, Tdoc R2-105462, Xian, China, 17 pages. (Oct. 11-15, 2010).

Interdigital, "MAC PHR Contents", 3GPP TSG RAN WG2 #72, R2-106417, Jacksonville, Florida, 8 pages, (Nov. 8-12, 2010).

ITRI, "PHR Format for CA", 3GPP TSG RAN WG2 #71bis, R2-105818, Xi'an, China, 5 pages, (Oct. 11-15, 2010).

PCT Notification Concerning Transmittal of International Preliminary Report on Patentability (Chapter I of the Patent Cooperation Treaty) for counterpart PCT Application No. PCT/CN2012/071803, 23 pp. (including English translation), (Sep. 12, 2013).

* cited by examiner

METHOD, SYSTEM, AND DEVICE FOR POWER HEADROOM REPORTING AND SUB-FRAME SCHEDULING

CROSS-REFERENCE TO RELATED APPLICATIONS

This patent application is a U.S. National Stage under 35 U.S.C. §371 of International Application No. PCT/CN2012/071803, filed on Feb. 29, 2012, entitled METHOD, SYSTEM, AND DEVICE FOR POWER HEADROOM REPORTING AND SUB-FRAME SCHEDULING, designating the United States, and claiming the benefit of Chinese Patent Application No. 201110051866.1, filed with the Chinese Patent Office on Mar. 3, 2011 and entitled "Method, system and apparatus for power headroom reporting and subframe scheduling", which was incorporated by reference in its entirety.

FIELD OF THE INVENTION

The present invention relates to the field of wireless communications and particularly to a method, system and apparatus for power headroom reporting and subframe scheduling.

BACKGROUND OF THE INVENTION

In an existing Long Term Evolution (LTE) system, there is only one carrier with a maximum bandwidth of 20 MHz available in a cell. In a Long Term Evolution-Advanced (LTE-A) system, peak rates of the LTE-A system have been improved so greatly over the LTE system that there are a required downlink rate up to 1 Gbps and uplink rate up to 500 Mbps of the LTE-A system. Obviously such a demand has not been satisfied by the bandwidth of 20 MHz. Carrier Aggregation (CA) has been introduced to enable the LTE-A system to satisfy the demand.

Carrier aggregation refers to that the ability of a user equipment to operate concurrently in a plurality of cells which can be consecutive or inconsecutive in the frequency domain and which may have the same or different bandwidths. A maximum bandwidth of each cell is limited to 20 MHz for compatibility with the LTE system. At present it is generally recognized that the number of cells aggregated for a user equipment is 5 at most. Moreover the LTE-A system further categorizes the cells aggregated for the user equipment as follows dependent on different functions that may be supported in the different cells:

A Primary Cell (PCell), where only one of the cells aggregated for the user equipment is defined as a PCell which is selected by an eNB and configured in Radio Resource Control (RRC) signaling to the user equipment and only in which a Physical Uplink Control Channel (PUCCH) is configured.

A Secondary Cell (SCell), where all the other cells aggregated for the user equipment than the PCell are SCells.

Power Headroom Reporting (PHR) defined in the LTE-A Release 10 (R10) requires a report of Power Headroom (PH) information in configured and active cells, that is, PH information in all the configured and active cells is packaged and reported together once is PHR is triggered.

Figure 1A:
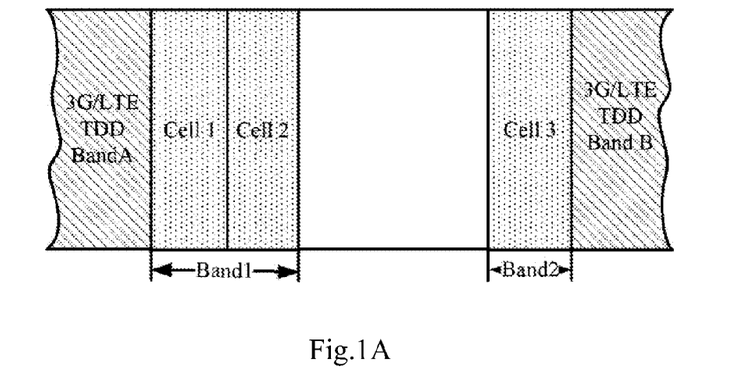
FIG. 1A is a schematic diagram of different UL/DL configurations for different bands aggregated for the CA user equipment in the LTE-A system.

In the R10, only intra-band Carrier Aggregation (intra-band CA) is supported in the uplink, so the same Time Division Duplex (TDD) configuration is sure to be used for all the uplink carriers aggregated for a user equipment. In an R11 system, aggregation of cells from different band (inter-band CA) will be introduced, so a frequency band aggregated in the LTE-A system may be shared with or adjacent to another system (e.g., the LTE system), for example, three cells including Cell 1, Cell 2 and Cell 3 are aggregated for an LTE-A user equipment as illustrated in FIG. 1.A, where the same Band 1 is used for the Cell 1 and the Cell 2, and a Band 2 is used for the cell 3. In order to avoid uplink/downlink cross interference between TDD systems, TDD Uplink/Downlink (UL/DL) configurations that can coexist, i.e., configurations without UL/DL cross interference, meaning the same TDD UL/DL configuration for the LTE system, shall be used for the Band 1 and a 3G/LTE TDD Band A. TDD UL/DL configurations that can coexist shall be used for the Band 2 and a 3G/LTE TDD Band B. If different TDD UL/DL configurations are used for the Band A and the Band B, then TDD UL/DL configurations used for the Band 1 and the Band 2 are also different.

For the R10, only intra-band aggregation is supported in the uplink, so all the cells are either an uplink subframe or a downlink subframe at the same instant for the TDD system, and thus the user equipment can report PH information in all the configured and active cells in an uplink subframe once PH reporting is triggered so that the eNB obtains the PH information of the user equipment as a whole.

Figure 1B:
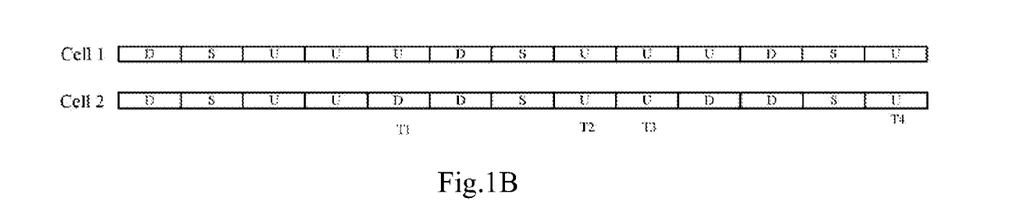
FIG. 1B is a schematic diagram of a multi-TDD UL/DL configuration.

For the R11, due to the introduction of inter-band aggregation and different TDD UL/DL configurations, subframe states of different cells may be different as illustrated in FIG. 1B. Assumed TDD UL/DL configurations 0 and 1 are adopted respectively for the Cell 1 and the Cell 2, for an instant T1, if PH reporting is triggered in the Cell 1 and PH information is currently reported only for a configured and active uplink subframe, then the user equipment will report only PH information of the Cell 1 at the instant T1, and the PH information can not reflect a power allocation condition of the user equipment in the case that both the Cell 1 and the Cell 2 are uplink subframes, so when the Cell 1 and the Cell 2 are uplink subframes in all the instants T2, T3 and T4, the eNB can not perform UL scheduling of the instants T2, T3 and T4 with use of the PH information obtained at the instant T1.

In summary, PH information is currently reported for only an uplink subframe, so the existing PHR mechanism discourages subsequent scheduling in the case that there are different TDD UL/DL configurations for a plurality of configured and active cells aggregated for a user equipment.

SUMMARY OF THE INVENTION

Embodiments of the invention provide a method, system and apparatus for power headroom reporting and subframe scheduling so as to address such a problem in the prior art that PH information is reported for only an uplink subframe and the existing PHR mechanism discourages subsequent scheduling in the case that there are different TDD UL/DL configurations for a plurality of configured and active cells aggregated for a user equipment.

An embodiment of the invention provides a method of power headroom reporting, the method including:

determining Power Headroom (PH) information of each of configured and active cells at a current instant if PH information is required to be reported, wherein the configured and active cells include a cell which is configured with a downlink subframe at the current instant; and reporting the determined PH information.

An embodiment of the invention provides a method of subframe scheduling, the method including:

receiving PH information, reported from a user equipment, of each of configured and active cells at a current instant, wherein the configured and active cells include a cell which is configured with a downlink subframe at the current instant; and scheduling a subsequent uplink subframe according to the received PH information.

An embodiment of the invention provides an apparatus for power headroom reporting, the apparatus including:

a PH information determining module, configured to determine PH information of each of configured and active cells at a current instant if PH information is required to be reported, wherein the configured and active cells include a cell which is configured with a downlink subframe at the current instant; and a reporting module configured to report the determined PH information.

An embodiment of the invention provides an apparatus for subframe scheduling, the apparatus including:

a receiving module configured to receive PH information, reported from a user equipment, of each of configured and active cells at a current instant, wherein the configured and active cells include a cell which is configured with a downlink subframe at the current instant; and a scheduling module configured to schedule a subsequent uplink subframe according to the received PH information.

An embodiment of the invention provides a system for subframe scheduling, the system including:

a user equipment configured to report PH information by determining PH information of each of configured and active cells at a current instant and reporting the determined PH information, wherein the configured and active cells include a cell which is configured with a downlink subframe at the current instant; and a network-side apparatus configured to receive the PH information, reported from the user equipment, of each of configured and active cells at the current instant and to schedule a subsequent uplink subframe according to the received PH information.

Since a downlink subframe can be virtualized as an uplink subframe and PH information of a cell is determined according to a virtual uplink PUCCH and/or PUSCH transmission format, uplink transmission in an uplink subframe can be scheduled with use of the PH information when the cell is changed to be configured with the uplink subframe.

Since the PH information, received by the eNB, reported from the user equipment is PH information of each of configured and active cells at a current instant, including PH information of a cell which is configured with a downlink subframe at the current instant, an influence of incomplete PH information upon subsequent scheduling can be avoided to thereby facilitate subsequent scheduling and improve the efficiency of scheduling and the stability of the system.

DETAILED DESCRIPTION OF THE EMBODIMENTS

In an embodiment of the invention, a user equipment reports PH information by determining and reporting PH information of each of configured and active cells at a current instant, where the configured and active cells include a cell which is configured with a downlink subframe at the current instant. Since the PH information of the downlink subframe can be determined, incomplete PH information in a plurality of cells with different uplink/downlink configurations can be avoided.

In an embodiment of the invention, PH information, reported from a user equipment, of each of configured and active cells at a current instant is received, and a subsequent uplink subframe is scheduled according to the received PH information, where the configured and active cells include a cell which is configured with a downlink subframe at the current instant. Since the received PH information, reported from the user equipment, of each of configured and active cells at the current instant includes the PH information of the cell which is configured with a downlink subframe at the current instant, incomplete PH information and an influence thereof upon subsequent scheduling can be avoided.

Particularly the solutions according to the embodiments of the invention can be applicable to an LTE-A system and can also be applicable to other systems in which subframe states of different cells aggregated for a user equipment may be different at the same instant.

The following description will be given firstly of an implementation with cooperation of the network side and the user equipment side and finally of implementations respectively at the network side and the user equipment side, but this will not suggest that both sides must cooperate for an implementation, and indeed also problems existing respectively with the network side and the user equipment side can be addressed with the separate implementations at the network side and the user equipment side although a better technical effect can be achieved when they are used in cooperation.

Figure 2:
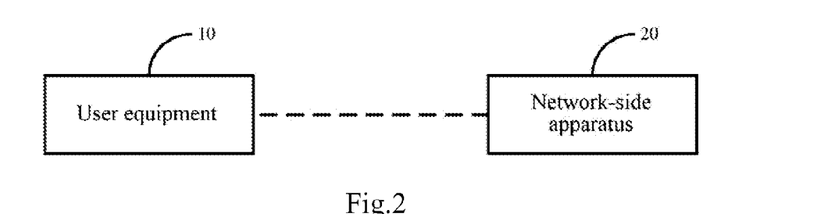
FIG. 2 is a schematic structural diagram of a system for subframe scheduling according to an embodiment of the invention.

As illustrated in FIG. 2, a system for subframe scheduling according to an embodiment of the invention includes a user equipment 10 and a network-side apparatus 20.

The user equipment 10 is configured to report PH information by determining PH information of each of configured and active cells at a current instant and reporting the determined PH information, where the configured and active cells include a cell which is configured with a downlink subframe at the current instant.

The network-side apparatus 20 is configured to receive the PH information, reported from the user equipment, of each of configured and active cells at the current instant and to schedule a subsequent uplink subframe according to the received PH information.

The configured and active cell refers to a cell in which data transmission can be performed between the eNB and the user equipment. Particularly:

The configured cell refers to a cell configured by the eNB in Radio Resource Control (RRC) signaling. The configured cell is in an inactive state by default, that is, such a cell is temporally unavailable to data transmission between the eNB and the user equipment and will be available only after being activated.

The configured and active cell refers to a cell configured in RRC signaling and then activated in activation signaling by the eNB, and such a cell is available to data transmission between the eNB and the user equipment.

Since subframe states of different cells aggregated for a user equipment may be different at the same instant, the configured and active cells may include a cell which is configured with a downlink subframe at the current instant and a cell which is configured with a uplink subframe at the current instant.

For the cell which is configured with a uplink subframe at the current instant, if there is real PUCCH and/or real Physical Uplink Shared Channel (PUSCH) data transmission, then the PH information of the cell is calculated from the real data transmission; otherwise, the PH information of the cell is calculated according to a virtual PUCCH format and/or a virtual PUSCH transmission format.

In an LTE-A system, two types of PH information, Type 1 and Type 2, are defined to calculate PH information per cell and calculated under the following rule:

Type 1: $PH=P\text{cmax},c-P\text{pusch},c$

Type 2: $PH=P\text{cmax},c-P\text{pusch},c-P\text{pucch},c$

Where:
Pcmax,c: maximum configurable transmission power allowed in the cell;
Ppusch,c: PUSCH transmission power in the cell; and
Ppucch,c: PUCCH transmission power in the cell.

PH information of Type 1 and Type 2 is used under the following rule:

PH information of both Type 1 and Type 2 is defined for a PCell. If simultaneous PUCCH and PUSCH transmission is configured, then PH information of both Type 1 and Type 2 will be reported in the PCell once PH information is triggered; otherwise, only PH information of Type 1 will be reported. For a SCell, only PH information of Type 1 is defined because there is PUCCH over its UL CC.

Preferably for the cell which is configured with a downlink subframe at the current instant, the PH information of the cell is calculated according to the virtual PUCCH format and/or the virtual PUSCH format.

For the configured and active cell, if there is real PUCCH or real PUSCH data transmission therein, then Ppusch,c and Ppucch,c are calculated from the real data transmission, and in the case that there is no real data transmission, Ppusch,c and Ppucch,c are calculated according to the virtual PUCCH format and/or the virtual PUSCH transmission format.

The virtual PUCCH format and/or the virtual PUSCH transmission format can be the same as a virtual PUCCH format and/or PUSCH transmission format defined in the R10 or can be a new format(s) defined at the physical layer.

If the virtual PUCCH format and/or PUSCH transmission format defined in the R10 is adopted, then related parameters in calculation of a PH according to the virtual PUCCH transmission format take the following values:

A power control related parameter is:

$\delta PUCCH=0$ dB;

Related parameters to calculate Pcmax,c are as follows:
If there is no simultaneous PUSCH data transmission in the cell, then a Maximum Power Reduction (MPR), an Additional Maximum Power Reduction (A-MPR) and ΔTc take the value of 0 dB; otherwise, the values of these parameters are determined from real PUSCH data transmission.

Other parameters take values configured at the RRC layer.

Related parameters in calculation of a PH according to the virtual PUSCH transmission format take the following values:

Power control related parameters are:

$10 \log(M_{PUSCH,c}(i))=0$ dB;

$Ks=0;$ and $\delta PUSCH=0$ dB,

Where particular reference is made to the definitions in the R10 for physical meanings of MPUSCH, c(i) and Ks.

Related parameters to calculate Pcmax,c are as follows:
If there is no simultaneous PUCCH data transmission in the cell, then an MPR, an A-MPR and ΔTc take the value of 0 dB; otherwise, the values of these parameters are determined from real PUCCH data transmission.

Other parameters take values configured at the RRC layer.

The PH information of the cell is calculated according to the virtual PUCCH format and/or the virtual transmission format in the following three scenarios: it is calculated only according to the virtual PUCCH transmission format, only according to the virtual PUSCH transmission format and according to the virtual PUCCH and PUSCH transmission formats.

Preferably if the cell is a primary cell and configured with simultaneous PUCCH and PUSCH transmission, then PH information of Type 2 (i.e., Type 2 PH=Pcmax,c−Ppusch, c−Ppucch,c here and below) corresponding to the cell is calculated according to the virtual PUCCH transmission format and the virtual PUSCH transmission format, and PH information of Type 1 (i.e., Type 1 PH=Pcmax,c−Ppusch,c here and below) corresponding to the cell is calculated according to the virtual PUSCH transmission format;

If the cell is a primary cell and not configured with simultaneous PUCCH and PUSCH transmission, then PH information of Type 1 corresponding to the cell is calculated according to the virtual PUSCH transmission format; and If the cell is a secondary cell, then PH information of Type 1 corresponding to the cell is calculated according to the virtual PUSCH transmission format.

Preferably the user equipment 10 reports all the determined PH information by placing the PH information into a PHR Media Access Control Control Element (PHR MAC CE) and transmitting the PHR MAC CE in an uplink subframe, where the length of an L field in an MAC sub-header corresponding to the PHR MAC CE shall take a value in view of that the cell configured and active at the current instant is a cell configured with a downlink subframe.

It shall be noted that the embodiment of the invention will not be limited to the foregoing scheme of transmitting the PH information in the PHR MAC CE, and any other scheme capable of transmitting the PH information will be applicable to the embodiment of the invention.

In an implementation, the user equipment 10 determines maximum configurable carrier transmission power of the cell before determining the PH information of the cell.

Particularly if the cell is a primary cell, then maximum configurable carrier transmission power to calculate PH information of Type 1 and maximum configurable carrier transmission power to calculate PH information of Type 2 is determined; and If the cell is a secondary cell, then maximum configurable carrier transmission power to calculate PH information of Type 1 is determined;

Preferably Pcmax,c can be further calculated in view of an influence of a power reduction resulting from real uplink data transmission of the user equipment at the instant.

Preferably the user equipment 10 reports the maximum configurable carrier transmission power of the cell after determining the maximum configurable carrier transmission power.

For example, the user equipment 10 places the maximum transmission power in the PHR MAC CE and transmits the PHR MAC CE in the uplink subframe.

It shall be noted that the embodiment of the invention will not be limited to the foregoing scheme of transmitting the maximum transmission power in the PHR MAC CE, and any other scheme capable of transmitting the maximum transmission power will be applicable to the embodiment of the invention.

If the PH information is reported in the PHR MAC CE, then preferably the PH information of the respective cells is sorted in the PHR MAC CE according to cell index. For example, the PH information is arranged in an ascending order.

Of course, the maximum transmission power can also be reported in the PHR MAC CE by sorting the maximum transmission power of the respective cells in the PHR MAC CE according to cell index.

If the PH information and the maximum transmission power are reported in the PHR MAC CE, then the PH information and the maximum transmission power of the same cell can be bound into report information, and then the report information of the respective cells can be sorted in the PHR MAC CE according to cell index.

In an implementation, there are numerous mechanism to trigger the user equipment to report PH information, and several examples will be listed below:

A prohibited PH reporting timer (prohibitPHR-Timer) expires, the user equipment has a resource available to new uplink data transmission, and a pathloss of at least one of a plurality of active cells aggregated for the user equipment changes from a last PH information report instant by more than an uplink pathloss change threshold (dl-Pathloss-Change) in dB;

Expiration of a periodical PH reporting timer (periodicPHR-Timer) expires;

Upon configuration or reconfiguration of the PH reporting functionality by upper layers (except configuration disabling PH reporting); and Activation of a specific configured cell.

It shall be noted that the embodiment of the invention will not be limited to the foregoing several trigger schemes, and any other scheme capable of triggering the user equipment to make a report will be applicable to the embodiment of the invention.

The network-side apparatus 20 will receive the PH information, reported from the user equipment, of each of configured and active cells at the current instant, where the configured and active cells include a cell which is configured with a downlink subframe at the current instant.

Preferably if the user equipment 10 reports the PH information in the PHR MAC CE, then the network-side apparatus 20 extracts the PH information from the PHR MAC CE.

Preferably if the user equipment 10 reports the maximum configurable carrier transmission power in the PHR MAC CE, then the network-side apparatus 20 extracts from the PHR MAC CE the maximum configurable carrier transmission power for the respective cells.

The network-side apparatus according to the embodiment of the invention can be an eNB (e.g., a macro eNB, a home eNB, etc.) or can be a Relay Node (RN) apparatus or can be another network-side apparatus.

Based upon the same inventive idea, embodiments of the invention further provide a user equipment, a network-side apparatus, a method of power headroom reporting and a method of subframe scheduling, and since these apparatus and methods address the problem under a similar principle to that of the system for power headroom reporting, reference can be made to the implementation of the system for implementations of these apparatus and methods, and a repeated description thereof will be omitted here.

Figure 3:
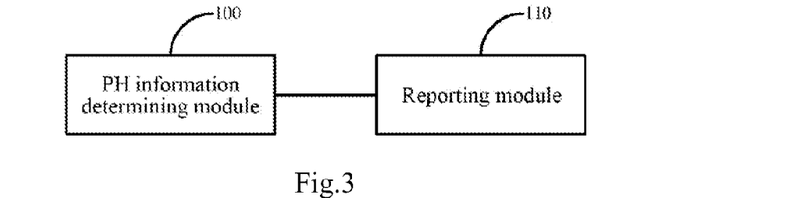
FIG. 3 is a schematic structural diagram of a user equipment according to an embodiment of the invention.

As illustrated, a user equipment according to an embodiment of the invention includes a PH information determining module 100 and a reporting module 110.

The PH information determining module 100 is configured to determine PH information of each of configured and active cells at a current instant if PH information is required to be reported, where the configured and active cells include a cell which is configured with a downlink subframe at the current instant.

The reporting module 110 is configured to report the PH information determined by the PH information determining module 100 so that a network-side apparatus can schedule a subsequent uplink subframe according to the PH information Preferably for the cell which is configured with a downlink subframe at the current instant, the PH information determining module 100 calculates the PH information of the cell according to a virtual PUCCH transmission format and/or a virtual PUSCH transmission format.

Particularly if the cell is a primary cell and configured with simultaneous PUCCH and PUSCH transmission, then the PH information determining module 100 calculates PH information of Type 2 corresponding to the cell according to the virtual PUCCH transmission format and the virtual PUSCH transmission format, and calculates PH information of Type 1 corresponding to the cell according to the virtual PUSCH transmission format; if the cell is a primary cell and not configured with simultaneous PUCCH and PUSCH transmission, then the PH information determining module 100 calculates PH information of Type 1 corresponding to the cell according to the virtual PUSCH transmission format; or if the cell is a secondary cell, then the PH information determining module 100 calculates PH information of Type 1 corresponding to the cell according to the virtual PUSCH transmission format.

Preferably the PH information determining module 100 determines maximum configurable carrier transmission power of the cell before determining the PH information of the cell; and correspondingly the reporting module 110 reports the determined maximum configurable carrier transmission power of the cell.

Preferably if the cell is a primary cell, then the PH information determining module 100 determines maximum configurable carrier transmission power to calculate PH information of Type 1 and maximum configurable carrier transmission power to calculate PH information of Type 2; or if the cell is a secondary cell, then the PH information determining module 100 determines maximum configurable carrier transmission power to calculate PH information of Type 1.

Preferably the reporting module 110 places all the determined PH information into a PHR MAC CE and transmits the PHR MAC CE in an uplink subframe.

Preferably the reporting module 110 places the maximum configurable carrier transmission power in a PHR MAC CE and transmits the PHR MAC CE in an uplink subframe.

Preferably the reporting module 110 sorts the report information of the respective cells in the PHR MAC CE according to cell index before reporting the determined PH information.

Figure 4:
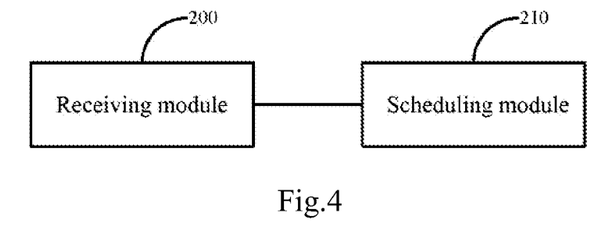
FIG. 4 is a schematic structural diagram of a network-side apparatus according to an embodiment of the invention.

As illustrated in FIG. 4, a network-side apparatus according to an embodiment of the invention includes a receiving module 200 and a scheduling module 210.

The receiving module 200 is configured to receive PH information, reported from a user equipment, of each of configured and active cells at a current instant, where the configured and active cells include a cell which is configured with a downlink subframe at the current instant.

The scheduling module 210 is configured to schedule a subsequent uplink subframe according to the PH information received by the receiving module 200.

Preferably the receiving module 200 extracts the PH information from a PHR MAC CE.

Preferably the receiving module 200 extracts, from a PHR MAC CE, maximum configurable carrier transmission power for the respective cells.

Figure 5:
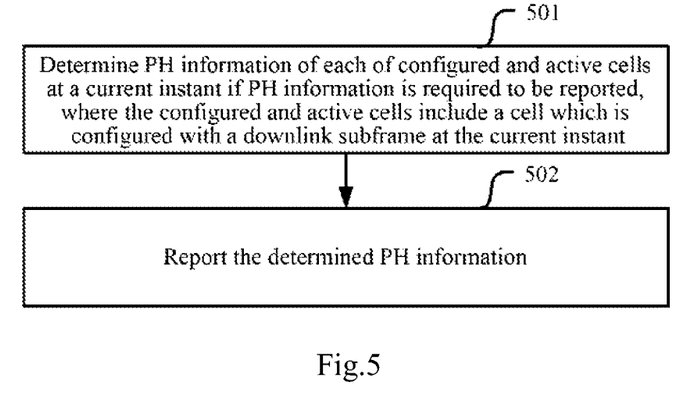
FIG. 5 is a schematic flow chart of a method of power headroom reporting according to an embodiment of the invention.

As illustrated in FIG. 5, a method of power headroom reporting according to an embodiment of the invention includes the following steps:

The step 501 is to determine PH information of each of configured and active cells at a current instant if PH information is required to be reported, where the configured and active cells include a cell which is configured with a downlink subframe at the current instant.

The step 502 is to report the determined PH information.

Since subframe states of the different cells may be different at the same instant, the configured and active cells may include a cell which is configured with a downlink subframe at the current instant and a cell which is configured with a uplink subframe at the current instant.

In the step 501, for the cell which is configured with a uplink subframe at the current instant, if there is real PUCCH and/or real Physical Uplink Shared Channel (PUSCH) data transmission, then the PH information of the cell is calculated from the real data transmission; otherwise, the PH information of the cell is calculated according to a virtual PUCCH transmission format and/or a virtual PUSCH transmission format.

Preferably in the step 501, for the cell which is configured with a downlink subframe at the current instant, the PH information of the cell is calculated according to the virtual PUCCH transmission format and/or the virtual PUSCH transmission format.

For the configured and active cell, if there is real PUCCH or real PUSCH data transmission therein, then Ppusch,c and Ppucch,c are calculated from the real data transmission, and in the case that there is no real data transmission, Ppusch,c and Ppucch,c are calculated according to the virtual PUCCH transmission format and/or the virtual PUSCH transmission format.

The virtual PUCCH transmission format and/or the virtual PUSCH transmission format can be the same as a virtual PUCCH format and/or PUSCH transmission format defined in the R10 or a new format(s) defined at the physical layer.

The PH information of the cell is calculated according to the virtual PUCCH transmission format and/or the virtual PUSCH transmission format in the following three scenarios: it is calculated only according to the virtual PUCCH transmission format, only according to the virtual PUSCH transmission format and according to the virtual PUCCH and virtual PUSCH transmission formats.

Preferably if the cell is a primary cell and configured with simultaneous PUCCH and PUSCH transmission, then PH information of Type 2 corresponding to the cell is calculated according to the virtual PUCCH transmission format and the virtual PUSCH transmission format, and PH information of Type 1 corresponding to the cell is calculated according to the virtual PUSCH transmission format;

If the cell is a primary cell and not configured with simultaneous PUCCH and PUSCH transmission, then PH information of Type 1 corresponding to the cell is calculated according to the virtual PUSCH transmission format; and If the cell is a secondary cell, then PH information of Type 1 corresponding to the cell is calculated according to the virtual PUSCH transmission format.

Preferably in the step 502, all the determined PH information is reported by placing the PH information into a PHR MAC CE and transmitting the PHR MAC CE in an uplink subframe, where the length of an L field in an MAC sub-header corresponding to the PHR MAC CE shall take a value in view of that the cell configured and active at the current instant is a cell configured with a downlink subframe.

It shall be noted that the embodiment of the invention will not be limited to the foregoing scheme of transmitting the PH information in the PHR MAC CE, and any other scheme capable of transmitting the PH information will be applicable to the embodiment of the invention.

In an implementation, maximum configurable carrier transmission power of the cell can be further determined before determining the PH information of the cell.

Particularly if the cell is a primary cell, then maximum configurable carrier transmission power to calculate PH information of Type 1 and maximum configurable carrier transmission power to calculate PH information of Type 2 is determined; and If the cell is a secondary cell, then maximum configurable carrier transmission power to calculate PH information of Type 1 is determined;

Preferably Pcmax,c can be further calculated in view of an influence of a power reduction resulting from real uplink data transmission of the user equipment at the instant.

Preferably the maximum configurable carrier transmission power of the cell is reported after determining the maximum configurable carrier transmission power.

For example, the maximum transmission power is placed in the PHR MAC CE and the PHR MAC CE is transmitted in the uplink subframe.

It shall be noted that the embodiment of the invention will not be limited to the foregoing scheme of transmitting the maximum configurable carrier transmission power in the PHR MAC CE, and any other scheme capable of transmitting the maximum configurable carrier transmission power will be applicable to the embodiment of the invention.

If the PH information is reported in the PHR MAC CE, then preferably the PH information of the respective cells is sorted in the PHR MAC CE according to cell index. For example, the PH information is arranged in an ascending order.

Of course, the maximum configurable carrier transmission power can also be reported in the PHR MAC CE by sorting the maximum configurable carrier transmission power of the respective cells in the PHR MAC CE according to cell index.

If the PH information and the maximum configurable carrier transmission power are reported in the PHR MAC CE, then the PH information and the maximum configurable carrier transmission power of the same cell can be bound into report information, and then the report information of the respective cells can be sorted in the PHR MAC CE according to cell index.

Figure 6:
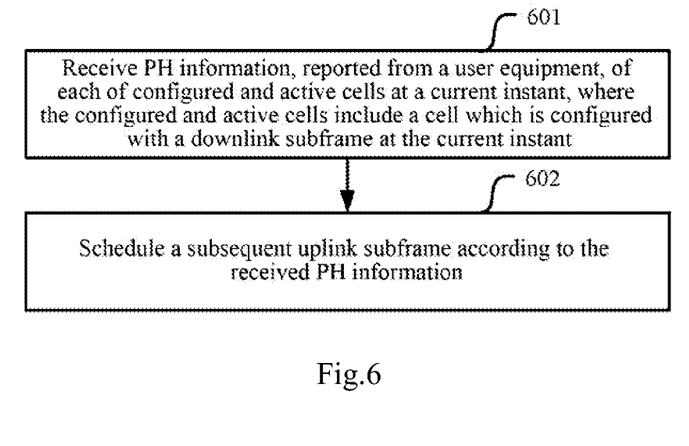
FIG. 6 is a schematic flow chart of a method of subframe scheduling according to an embodiment of the invention.

As illustrated in FIG. 6, a method of subframe scheduling according to an embodiment of the invention includes the following steps:

The step 601 is to receive PH information, reported from a user equipment, of each of configured and active cells at a current instant, where the configured and active cells include a cell which is configured with a downlink subframe at the current instant.

The step 602 is to schedule a subsequent uplink subframe according to the received PH information.

Preferably if the PH information is reported in a PHR MAC CE, then the PH information is extracted from the PHR MAC CE in the step 601.

Preferably maximum configurable carrier transmission power for the respective cells can be further received in the step 601. Particularly if the maximum configurable carrier transmission power is reported in a PHR MAC CE, then the maximum configurable carrier transmission power for the respective cells is extracted from the PHR MAC CE in the step 601.

Particularly FIG. 5 and FIG. 6 can be integrated into a flow of a new method of subframe scheduling, that is, firstly the step 501 and the step 502 and then the step 601 and the step 602 are performed.

Figure 7:
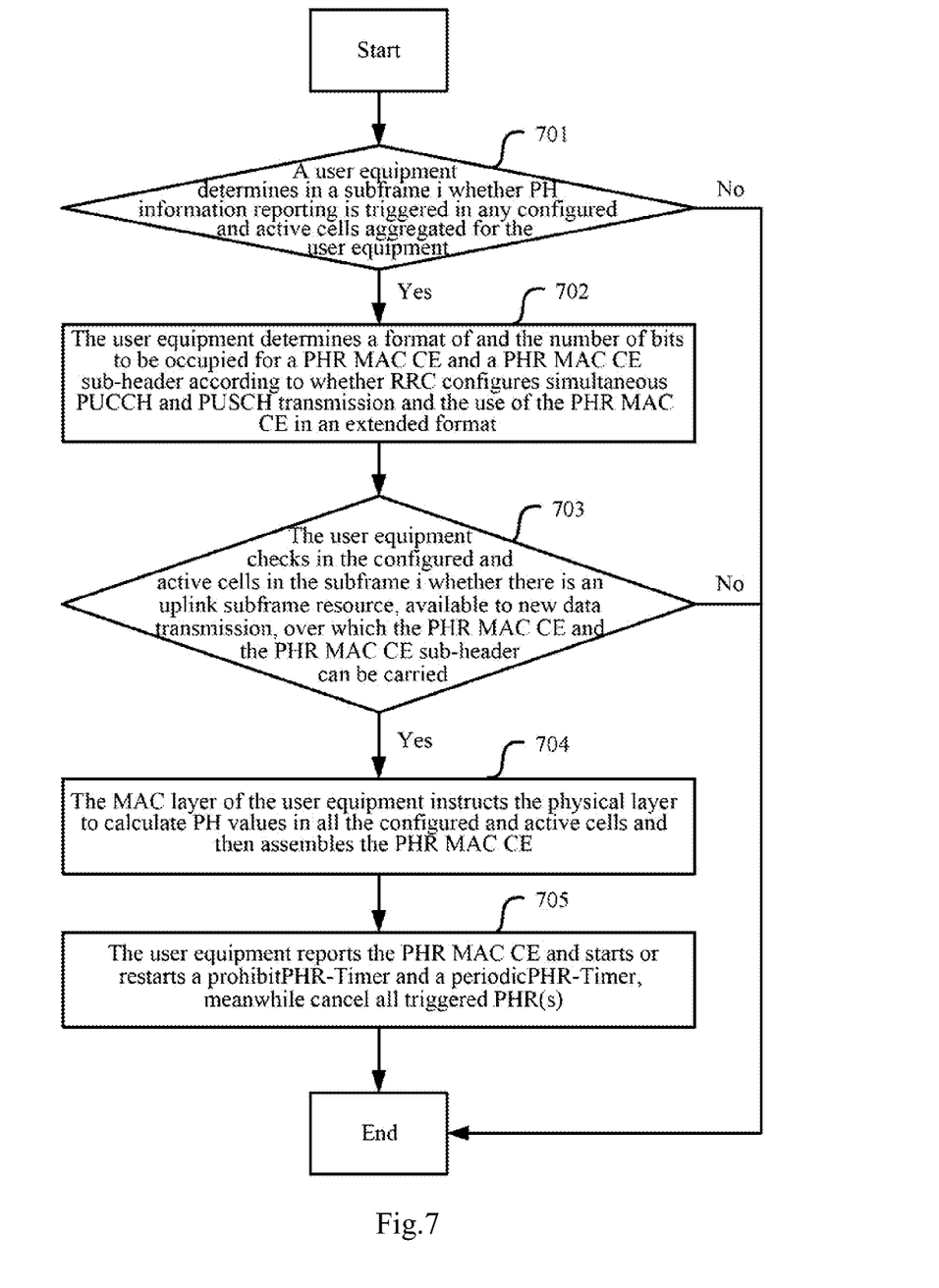
FIG. 7 is a schematic flow chart of a method of maintaining PH reporting in a subframe according to an embodiment of the invention.

As illustrated in FIG. 7, a method of maintaining PH reporting in a subframe according to an embodiment of the invention includes the following steps:

In the step 701, a user equipment determines in a subframe i whether PH information reporting is triggered in any configured and active cell aggregated for the user equipment, and if so, then the flow proceeds to the step 702; otherwise, the current flow ends.

In the step 702, the user equipment determines a format of and the number of bits to be occupied for a PHR MAC CE and a PHR MAC CE sub-header according to whether RRC configures simultaneous PUCCH and PUSCH transmission and the use of the PHR MAC CE in an extended format.

For example, if simultaneous PUCCH and PUSCH transmission is configured, then the PHR MAC CE will carry PH information of Type 2; and The number of bits to be occupied is the total number of bits occupied for the PHR MAC CE sub-header and the PHR MAC CE.

In the step 703, the user equipment checks in the configured and active cells in the subframe i whether there is an uplink subframe resource, available to new data transmission, over which the PHR MAC CE and the PHR MAC CE sub-header can be carried, and if so, then the flow proceeds to the step 704; otherwise, the current flow ends.

In the step 704, the MAC layer of the user equipment instructs the physical layer to calculate PH values in all the configured and active cells and then assembles the PHR MAC CE.

Particularly PH information of a cell which is configured with a downlink subframe at a current instance will also calculated according to a virtual transmission format.

In the step 705, the user equipment reports the PHR MAC CE and starts or restarts a prohibitPHR-Timer and a periodicPHR-Timer meanwhile cancel all triggered PHR(s).

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Since PH information of a downlink subframe can be determined, incomplete PH information in a plurality of cells with different uplink/downlink configurations can be avoided.

Since the PH information, reported from the user equipment, of each of configured and active cells at a current instant includes PH information of a cell which is configured with a downlink subframe at the current instant, an influence of incomplete PH information upon subsequent scheduling can be avoided to thereby facilitate subsequent scheduling and improve the efficiency of scheduling and the stability of the system.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

What is claimed is:

1. A method of power headroom reporting, wherein the method comprises:
    determining Power Headroom (PH) information of each of configured and active cells at a current instant if PH information is required to be reported, wherein the configured and active cells are aggregated with different Time Division Duplex (TDD) Uplink/Downlink (UL/DL) configurations for a user equipment (UE), and the configured and active cells comprise a cell which is configured with a downlink subframe at the current instant; and
    reporting the determined PH information which comprise the PH information of the configured and active cell which is configured with a downlink subframe at the current instant; wherein determining PH information of each of configured and active cells at a current instant comprises:
    for the cell which is configured with a downlink subframe at the current instant, virtualizing the downlink subframe by calculating the PH information of the cell according to a virtual Physical Uplink Control Channel (PUCCH) transmission format.

2. The method according to claim 1, wherein reporting the determined PH information comprises:
    placing all the determined PH information into a Power Headroom Reporting Media Access Control Control Element (PHR MAC CE), and transmitting the PHR MAC CE in an uplink subframe.

3. The method according to claim 1, wherein before determining the PH information of the cell, the method further comprises:
    determining maximum configurable carrier transmission power of the cell; and
    after determining the maximum configurable carrier transmission power of the cell, the method further comprises:
    reporting the maximum configurable carrier transmission power of the cell.

4. The method according to claim 3, wherein determining maximum configurable carrier transmission power of the cell comprises:
    if the cell is a primary cell, then determining maximum configurable carrier transmission power to calculate PH information of Type 1 and maximum configurable carrier transmission power to calculate PH information of Type 2; or
    if the cell is a secondary cell, then determining maximum configurable carrier transmission power to calculate PH information of Type 1.

5. The method according to claim 3, wherein reporting the maximum configurable carrier transmission power of the cell comprises:
    placing the maximum configurable carrier transmission power of the cell into a PHR MAC CE and transmitting the PHR MAC CE in an uplink subframe.

6. The method according to claim 1, wherein after determining the PH information and before reporting the determined PH information, the method further comprises:
    sorting the PH information of the configured and active cells in a PHR MAC CE in an ascending or descending order of cell indexes.

7. A method of subframe scheduling, wherein the method comprises:
    receiving PH information, reported from a user equipment, of each of configured and active cells at a current instant, wherein the configured and active cells are aggregated with different Time Division Duplex (TDD) Uplink/Downlink (UL/DL) configurations for a user equipment (UE), and the configured and active cells comprise a cell which is configured with a downlink subframe at the current instant, wherein the received PH comprises the PH information of the configured and active cell which is configured with a downlink subframe at the current instant; and
    scheduling a subsequent uplink subframe according to the received PH information;
    wherein for the cell which is configured with a downlink subframe at the current instant, virtualizing the downlink subframe by calculating the PH information of the cell according to a virtual Physical Uplink Control Channel (PUCCH) transmission format.

8. The method according to claim 7, wherein receiving PH information comprises:
    extracting the PH information from a PHR MAC CE.

9. The method according to claim 7, wherein the method further comprises:
    extracting, from a PHR MAC CE, maximum configurable carrier transmission power for each of the configured and active cells.

10. An apparatus for power headroom reporting, wherein the apparatus comprises:
    a PH information determining module, configured to determine PH information of each of configured and active cells at a current instant if PH information is required to be reported, wherein the configured and active cells are aggregated with different Time Division Duplex (TDD) Uplink/Downlink (UL/DL) configurations for a user equipment (UE), and the configured and active cells comprise a cell which is configured with a downlink subframe at the current instant; and
    a reporting module configured to report the determined PH information which comprise the PH information of the configured and active cell which is configured with a downlink subframe at the current instant;
    wherein the PH information determining module is further configured:
    for the cell which is configured with a downlink subframe at the current instant, virtualizing the downlink subframe by calculating the PH information of the cell according to a virtual Physical Uplink Control Channel (PUCCH) transmission format.

11. The apparatus according to claim 10, wherein the reporting module is further configured:
    to place all the determined PH information into a PHR MAC CE and to transmit the PHR MAC CE in an uplink subframe.

12. The apparatus according to claim 10, wherein the PH information determining module is further configured:
    to determine maximum configurable carrier transmission power of the cell before determining the PH information of the cell;

the reporting module is further configured:
to report the maximum configurable carrier transmission power of the cell.

13. The apparatus according to claim 12, wherein the PH information determining module is further configured:
if the cell is a primary cell, to determine maximum configurable carrier transmission power to calculate PH information of Type 1 and maximum configurable carrier transmission power to calculate PH information of Type 2; or if the cell is a secondary cell, to determine maximum configurable carrier transmission power to calculate PH information of Type 1.

14. The apparatus according to claim 12, wherein the reporting module is further configured:
to place the maximum configurable carrier transmission power of the cell in a PHR MAC CE and to transmit the PHR MAC CE in an uplink subframe.

15. The apparatus according to claim 10, wherein the reporting module is further configured:
to sort the PH information of the configured and active cells in a PHR MAC CE according to cell index before reporting the determined PH information.

\* \* \* \* \*